Patented Mar. 31, 1953

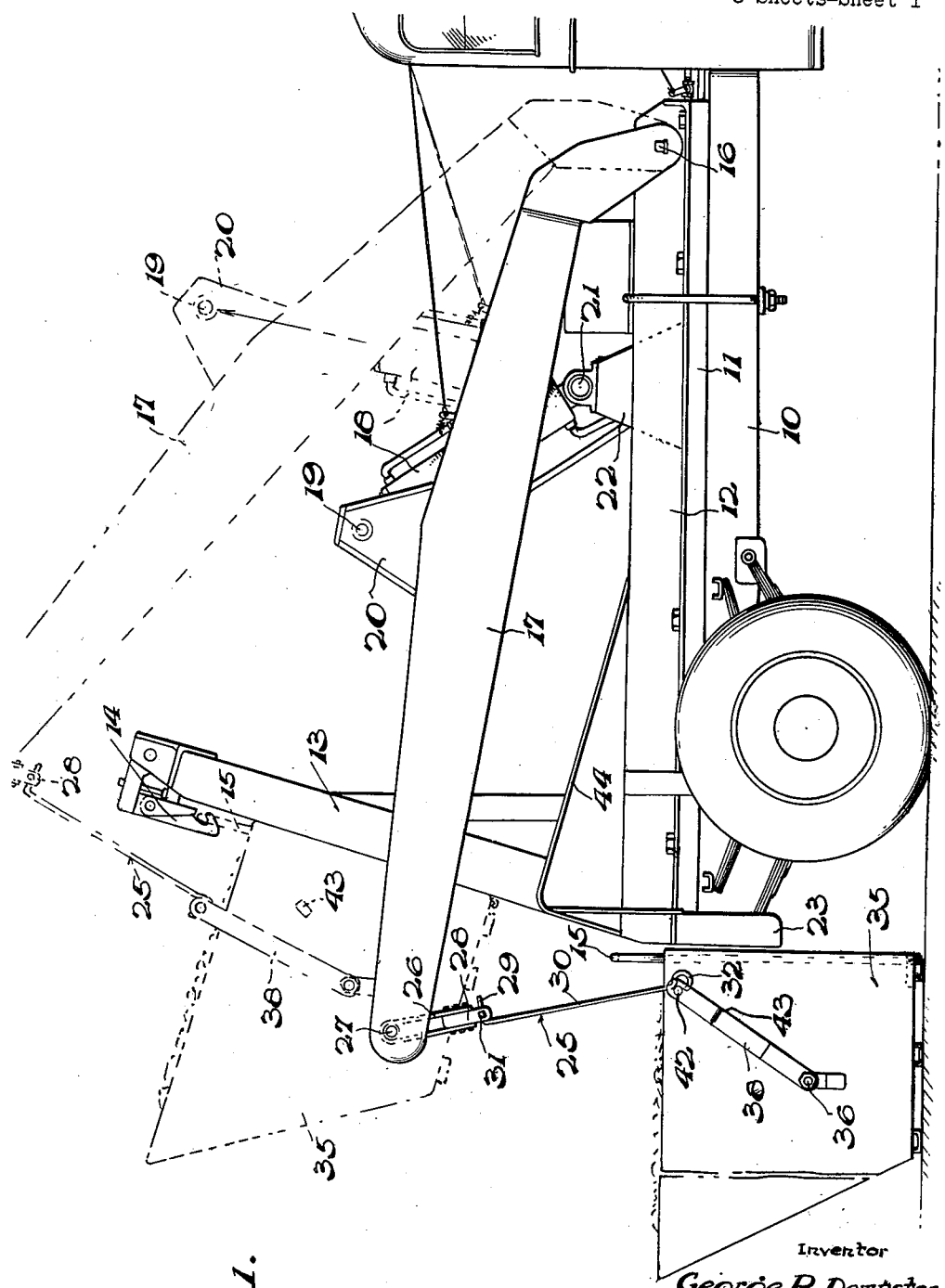

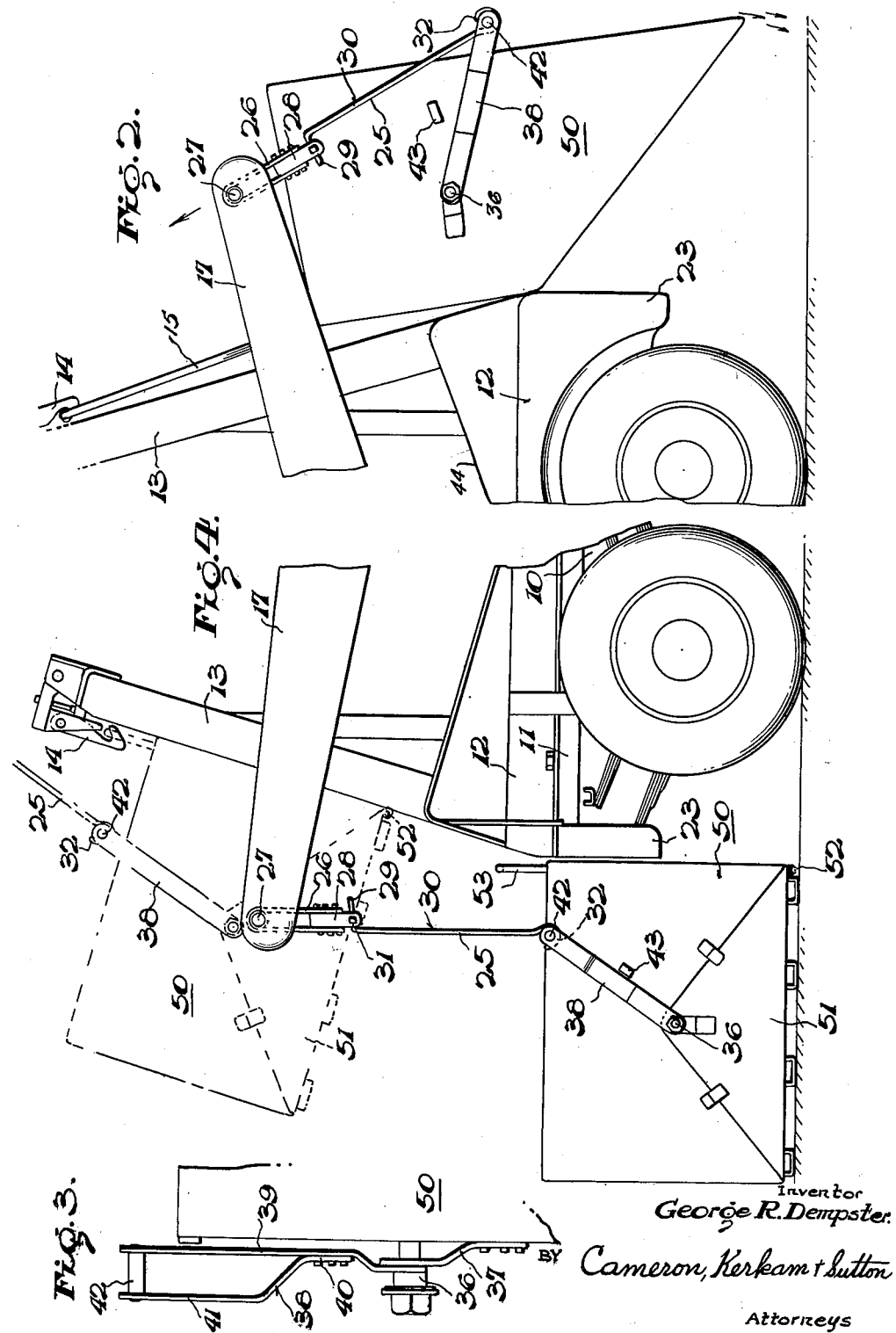

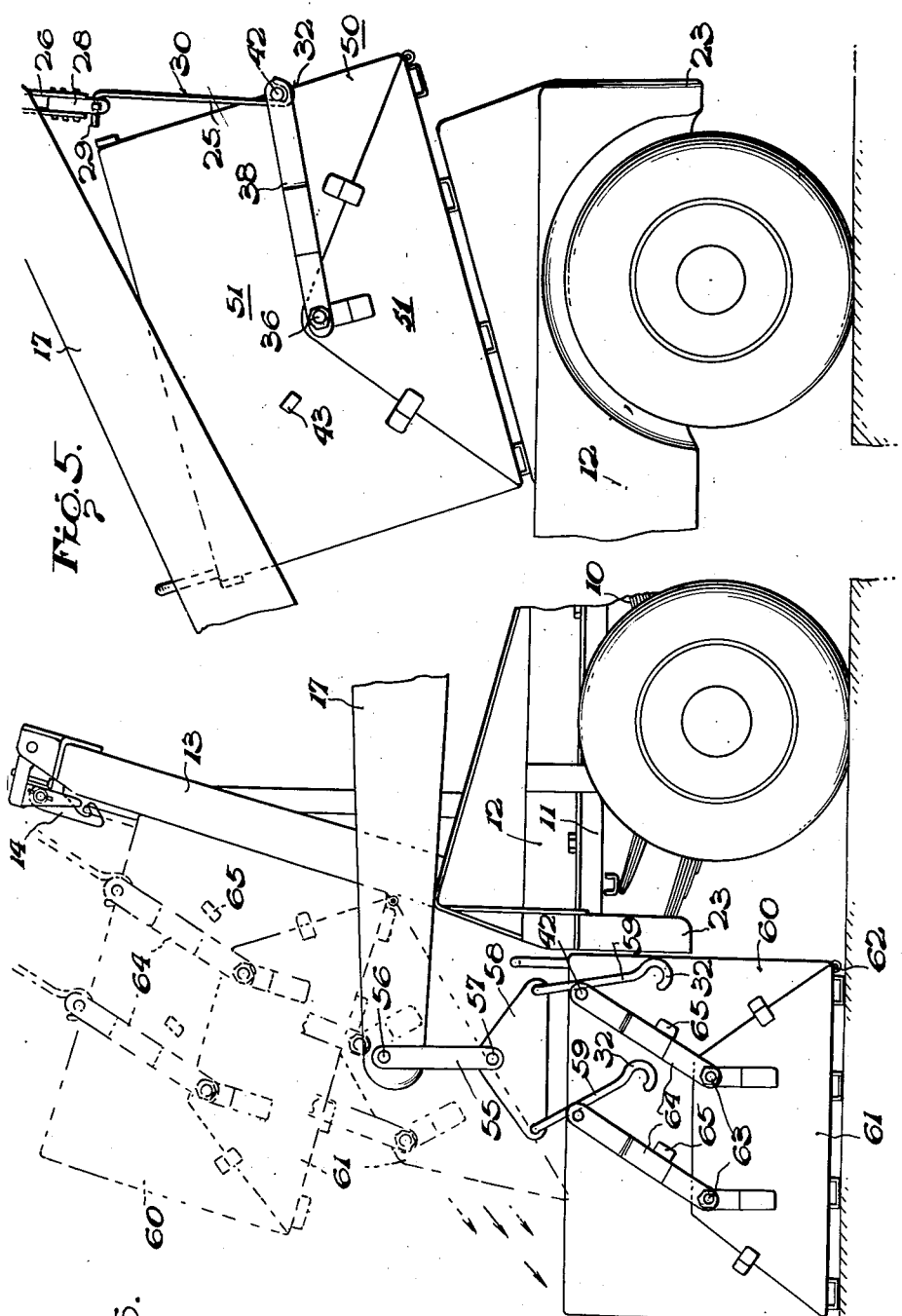

2,633,259

UNITED STATES PATENT OFFICE 2,633,259

TRANSPORTING AND DUMPING EQUIPMENT

George R. Dempster, Knoxville, Tenn.

Application March 11, 1947, Serial No. 733,938

7 Claims. (Cl. 214—317)

This invention relates to transporting and dumping equipment, and more particularly to equipment of this character for use on hand-steered trucks or other comparable vehicles.

Transporting and dumping equipment is well known wherein a truck chassis is provided with means for lifting and lowering containers with respect to a skid frame mounted on the truck chassis. Equipment of this character as heretofore proposed has been provided with lifting means on the main frame for lifting and lowering the containers, for example a pivoted boom provided with depending chains, cables or the like having suitable attaching elements, such as hooks, for attachment to pins or other suitable projections provided on the lateral walls of each container. Hence in order that the truck driver may remain in the cab to operate the controls, there must be an assistant on the ground attaching elements on the rig with or from the pins or the like on the container walls.

It is an object of this invention to provide transporting and dumping equipment of the above type wherein the engagement and disengagement of the raising and lowering mechanism with and from the container may be effected automatically as the truck is backed or advanced into cooperative relationship therewith.

Another object of this invention is to provide equipment of the type just characterized which does not require any special construction of the container itself.

It has heretofore been proposed in trolley types of transporting and dumping equipment to provide mechanism associated with the trolley whereby containers of suitable construction, when placed in suitable alignment with the known path of travel of the trolley, may be automatically picked up for transportation and dumping or deposit. Devices of this character as heretofore proposed, however, have not been suitable for use in conjunction with hand-steered trucks or the like which at best can be backed or advanced in only approximate alignment with the container. Moreover, devices of the character last referred to have usually required special mechanism on the trolley for engaging and disengaging the container, and usually a special construction of containeg, and have not been suitable for use on rigs of the type supplied for hand-steered trucks without substantial reconstruction of such rigs.

It is an object of this invention to provide equipment of the type characterized which is suitable for use on hand-steered trucks and comparable vehicles and which is operative to effect engagement and disengagement with and from the container even though the truck, when backing or approaching the container, is not exactly in alignment therewith or moving along a path at exact right angles to a face of the container.

Another object of this invention is to provide equipment of the type characterized of such construction that it may be readily used with transporting and dumping equipment of the type now on the market, or applied to equipment already in service, without change either in the rig itself or in the container itself.

Another object of this invention is to provide equipment of the type characterized which is so constructed that no interference with the dumping of the container from the rig is introduced whether the container be of the bottom dumping or tilt type.

Another object of this invention is to provide equipment of the type characterized wherein the provision for effecting automatic engagement with and disengagement from the container may be readily standardized so that if desired the same parts may be used whether the container is of the bottom dump or tilt type.

Another object of this invention is to provide equipment of the type characterized wherein the provision for effecting automatic engagement with and disengagement from the container is of simple but rugged construction so that it may be readily fabricated and assembled.

Other objects will appear as the description of the invention proceeds.

The invention is capable of receiving a variety of mechanical expressions, some of which are shown on the accompanying drawings, but it is to be expressly understood that the drawings are for purposes of illustration only, and are not to be construed as definitions of the limits of the invention, reference being had to the appended claims for that purpose.

Referring in detail to the accompanying drawings, wherein the same reference characters are used to indicate corresponding parts in the several figures, Fig. 1 is a side elevation of one commonly used type of transporting and dumping equipment embodying the present invention;

Fig. 2 is a side elevation of the rear end of the equipment at the opposite side from Fig. 1 to illustrate the relationship of the parts when a tilt type bucket is being dumped;

Fig. 3 is an elevational view, on an enlarged scale, of one of the stirrups used on each of the containers;

Fig. 4 is an elevation of the rear end of equipment such as shown in Fig. 1 but using a bottom dump type container;

Fig. 5 is a view at the opposite side from Fig. 4 but showing the container in transporting position; and Fig. 6 is a view corresponding to Fig. 1 but showing the equipment provided with suitable means for cooperating with a different construction of container.

As illustrated on the accompanying drawings, the invention is shown as incorporated in transporting and dumping equipment of the type disclosed in Dempster Patent No. 2,179,779, granted November 14, 1939, wherein the truck is provided at the rear of the chassis with a skid frame mounted on a carriage that is movable fore and aft with respect to the axis of the truck, but it is to be expressly understood that the invention is not limited to use with a rig of this character, as it may be readily applied to rigs of the type wherein the skid frame is not movable in a fore and aft direction with respect to the chassis, as shown for example in Dempster Patent No. 2,162,839, granted June 20, 1939.

Also, the drawings show the invention as applied to rigs mounted at the rear end of the chassis, but it is to be expressly understood that the invention is equally applicable to equipment wherein the lifting and lowering mechanism is disposed at the front end of the chassis so that the truck operator may move forwardly rather than back into cooperative relationship with the containers. Furthermore, while the invention is illustrated as of the type wherein the lifting and lowering mechanism of the rig is of the boom type, it will be apparent to those skilled in the art that the invention is not restricted in its application to rigs of the type illustrated.

Referring first to Figs. 1, 2 and 3 wherein the invention is shown as applied to a tilt type bucket for cooperation with transporting and dumping equipment of the character disclosed in the Dempster patent first hereinabove identified, 10 designates the chassis of a hand-steered truck or comparable vehicle of any suitable character and on which is mounted a frame 11 that provides a pair of fore and aft extending tracks 12 on which is movably mounted in any suitable way a carriage providing an upwardly extending skidway 13. As shown, the upper extremity of said skidway is provided with an automatic hook generally indicated at 14 for cooperation with a suitable bail 15 carried by a container, said automatic hook being as of the general type disclosed in Dempster application Serial No. 646,117, filed February 7, 1946, although any other suitable form of automatic hook may be used if preferred, such for example as shown in Dempster Patent No. 2,121,121, granted June 21, 1938, Dempster Patent No. 2,404,830, granted July 30, 1946, etc.

Also mounted on the frame 11, as by pivoting at 16, is a boom structure 17 of any suitable construction but shown as of the general type disclosed in Dempster Patent No. 2,369,722, granted February 20, 1945, and comprising parallel boom arms spaced transversely so as to embrace the containers to be handled, such boom structure being pivotally movable around its axis 16 by means of hydraulic mechanism generally indicated at 18 and pivotally connected at one end at 19 to a bridge-like structure 20 joining the two arms of the boom structure 17 and pivoted at 21 at its opposite end to a suitable support 22 carried by the frame 11. The rear extremity of the frame 11 is also shown as provided with a depending apron 23 which may be engaged by the container as it is being lifted by the boom structure 17 before coming into cooperative relationship with the skidway 13. As the rig as so far described constitutes no part of the present invention except as it enters into cooperation with the mechanism hereinafter described, and is fully disclosed in Dempster patents, a further detailed description thereof is deemed unnecessary.

Pivotally mounted on each arm of the boom structure 17, and preferably including provision for universal movement for a purpose hereinafter explained, is a member generally designated 25 provided at its free end with an attaching element and here shown as a hook. As shown, said member 25 comprises a U-shaped strap 26 mounted on any suitable pin or transverse member 27 carried by the boom structure so that it may swing pivotally in a fore and aft direction with respect to the truck. The ends of said U-shaped strap 26 are secured in any suitable way to a block 28, and secured in said block in any suitable way is the end 29 of the hook 30. End 29 is shown as mounted in a suitable aperture in block 28 so that it may rotate with respect thereto transversely of the axis of the chassis, and is held in said block in any suitable way as by a set screw 31 carried by said block 28 and engaged in a groove in said end 29 to prevent dislodgement thereof from said block while not interfering with rotational movement of the hook 30 in a transverse plane. The opposite end of the hook 30 is provided with a hook-shaped portion 32 of any suitable size for cooperating with a pin or the like on the container as next to be described. Owing to the foregoing mounting of the hook it will be observed that the hook 30 while normally hanging vertically downward under the influence of gravity can move in a fore and aft direction about the pin 27 and also swing in a transverse direction about its end 29 to facilitate engagement with the means on the container now to be described.

The container 35 of Figs. 1 and 2 is of a well known form of tilt type bucket, and may be of any suitable size, construction and material. Buckets of this type have heretofore been conventionally provided at each side thereof with a pin, lug or other suitable projection 36 (see Fig. 3) for the engagement thereof by a hook at the end of a chain, cable or like member suspended from the end of the boom structure at each side thereof, said pin or the like being shown as mounted on a bracket 37 suitably secured to a side wall of the container. In conformity with the present invention said pin 36 is provided with a pivotally mounted stirrup member generally designated 38 (see Fig. 3) having at its free end an attaching element complementary to that on member 25. As here shown, said stirrup member comprises a main portion 39 suitably apertured so as to be pivotally mounted on the pin 36 at one of its extremities. Suitably secured to said portion 39 at 40 is a second member 41 which extends parallelly to the member 39 for the major portion of its length, and adjacent their free ends said members 39 and 41 are connected by a pin 42 of a size suitable for engagement with the hook portion of hook member 25. As each stirrup member 38 is free to pivot around its pin 36 a stop member 43 is mounted on the side of the container as shown in Figs. 1 and 2, so that when the stirrup member 38 is free to move by gravity it will lie against the stop member 43 as shown in Fig. 1. The hook members 25 are mounted on their pins 27 so that they are spaced transversely of the rig by approximately the same amount as the stirrup members 38 on the container, and the combined length of the hook member 25 and stirrup member 38 at each side is such that when in tension they have substantially the same length as the chain, cable or the like which has heretofore been provided for attaching the container to the end of the boom structure.

In operation, and assuming that a filled container 35 is sitting on a floor, the ground, or the like ready for transportation, the truck 10 is backed up to the same (where as here illustrated the container is to be raised by a rig disposed at the rear of the truck) with the apron 23 as nearly aligned with and parallel to the forward face of the container 35 as obtainable by the usual steering of a truck. During such backing movement the hook members 25 are hanging vertically downward, but because of their capacity for universal movement about pins 27 and ends 29 it is not essential that the apron 23 be in exact alignment with the container or exactly parallel to the forward face thereof. As the truck backs into cooperative relationship with the container the two depending hook members 25 at opposite sides of the boom structure 17 will be roughly in alignment with the stirrup members 38 and they will deflect laterally to the extent required by their engagement with the stirrup members. The pin 42 of each stirrup member is preferably made on the order of four inches or more in length so as to allow a suitable latitude for engagement between said pin and the hook 30.

At this time each stirrup member 38 is lying by gravity against its stop member 43. As each hook member 25 engages a stirrup member 38 at each side of the container, each hook member 25 will be deflected forwardly from its vertically depending position and against the action of gravity, and it will be noted that as the two hook members 25 may move independently, there is no necessity that the apron 23 be exactly parallel to the forward face of the container in order that they shall perform their proper function. The hook members 25 are maintained in engagement with the stirrup members 38 by gravity as the truck is further backed toward the container and the hooks 30 eventually become engaged with the pins 42 on the stirrup members either before or during the elevation of the boom member 17 to lift the container off of the ground, the container being first guided by the apron 23 and thereafter sliding up the skidway 13.

If the skidway is mounted on a carriage movable forwardly with respect to the truck, then as illustrated more particularly with a bottom dump type container in Fig. 5, the skidway and container may be moved forwardly on the truck and the container deposited thereon, as on the inclined seats 44, in position for transportation. As during the lowering of the container onto said seats the free end of the boom structure is moving toward the right as viewed in Fig. 5, the hook members 25 cause the stirrup members 38 to move in a clockwise direction around their pivots 36 to the relationship shown in Fig. 5, in which position gravity holds the stirrup members in engagement with the hook members so that the hook extremities of the latter will not be disengaged from the pins 42.

When the container is to be dumped the boom structure 17 is again raised to lift the container 35 and the skidway 13 is moved to its rearmost position as shown in Fig. 1. When the container 35 is raised so as to engage its pivoted bail 15 with the automatic hook structure 14 as shown in dotted lines in Fig. 1, a lowering of the boom structure 17 will cause the container 35 to tip rearwardly about the pivotal axis of attachment of the bail 15 to the container, from the position shown in Fig. 1 to the position shown in Fig. 2, in a manner well understood in the art. During this movement of the container the pivot axes 36 are moving in a counter-clockwise direction as viewed in Fig. 1 while the boom structure is approaching said axes so that the hook members 25 and stirrup members 38 are caused to move into the angular relationship shown in Fig. 2, about the hinge joint formed by the cooperation of the hook portions 32 and pins 42. Meanwhile the stops 43 swing rearwardly about the bail axis as the container tilts and until it reaches its lowest position shown in Fig. 2, after which further descent of the boom structure has no further effect on the container. On subsequent elevation of the boom structure, the stirrup arms 38 engage the stops 43 and tilt the container in the reverse direction about the bail axis and the stirrups and hook members meanwhile straighten out and eventually restore the container to untilted position. The container may now be transported on the rig, either with or without moving it forwardly for deposit on the seats 44, to such position as it is to be deposited on a floor, the ground or the like, where, by manipulation of the boom structure 17 in a manner well understood in the art, the container 35 may be lowered until it is deposited on the surface on which it is to be received. A further slight lowering of the boom structure 17 will then disengage the hook members 25 from the pins 42, the stirrup members falling by gravity onto the stops 43, after which the truck may be moved away from the container, leaving it sitting on said surface.

It will therefore be observed that owing to the cooperative relationship between the hook members 25 and the stirrup members 38 the rig on the truck may be moved into cooperative relationship with the container and the lifting and lowering mechanism automatically engaged therewith without requiring the assistance of any second person to suitably engage the lifting mechanism with the lateral projections on the container or removing the same therefrom. At the same time, neither the rig nor the container requires any change in construction from that heretofore employed, as the hook members 25 may be pivotally mounted on the boom structure which has heretofore been provided with chains, cables or the like, while the stirrup members 38 may be pivotally mounted on the laterally projecting pins with which the containers have heretofore been conventionally provided. Furthermore, owing to the capacity of the hooks 30 to move laterally as well as forwardly and rearwardly, they may be readily engaged with the pins 42 even though in moving the truck into cooperative relationship with the container there is an absence of exact alignment or disposition of the apron 23 exactly parallel to the forward face of the container.

Referring now to Figs. 4 and 5, the invention is shown as applied to the handling of bottom dump type containers, the rig with its depending hook members 25 being the same as heretofore described in conjunction with Figs. 1 to 3, and therefore like parts are represented by like reference characters. As here shown, the bottom dump type container 50, which may be of any suitable size, construction and material, is provided with a dumping bottom 51 hinged to the body of the container at 52 in a manner well understood in the art. At each side of the dumping bottom portion 51 a laterally extending pin or the like 36 is commonly provided for the attachment thereto of the hooks or other suitable elements on the chains, cables or the like carried by the boom structure 17. Here, as in the embodiment of Figs. 1 to 3, a stirrup member 38 is pivotally mounted on each pin 36 and is shown as of the same construction as in the embodiments of Figs. 1 to 3, like parts being represented by like reference characters.

The manner of operation when a bottom dump type container is used is the same as heretofore explained in conjunction with the embodiment of Figs. 1 to 3. By moving the rig into cooperative relationship with the container the hooks 30 are brought into cooperative relationship with the pin 42, after which the container may be moved up the skidway 13 by the boom structure 17. As illustrated in Fig. 5, when the rig includes a forwardly and rearwardly movable carriage, said carriage may be moved forwardly on its tracks until the container is disposed over the seats 44, after which the container may be lowered by the boom structure 17 to rest on said seats, the relative arrangement of parts being such that the hook members 25 and stirrup members 38 move into the relationship shown in Fig. 5 so that the hooks 30 are retained in cooperative relationship with the pins 42 as heretofore explained. If the container is to be dumped, as in the embodiment of Figs. 1 to 3 the container 50 is moved upwardly to engage its bail 53 with the automatic hook 14, after which the container may be dumped in the manner well understood in the art, the bottom portion 51 moving about its pivot 52 with the hook and stirrup members 25, 38 held in cooperative relationship so that they are ready to close the open bottom member when the boom structure 17 is again moved upwardly.

Some containers of the bottom dump type are provided with a pair of laterally projecting pins or the like at each side of the bottom member so that the container may be suspended at a plurality of points. As shown in Fig. 6, the present invention may be readily applied to a rig adapted to cooperate with containers of this character. As here shown, the equipment carried on the truck chassis is the same as that heretofore explained, like reference characters being applied to like parts, but here the hook member at each side of the boom structure 17 comprises a depending link 55 pivoted to the boom structure at 56 and carrying at its opposite end, and pivoted thereto at 57, a triangularly-shaped member 58 at the lower opposite apices of which are provided a pair of hook members 59 which may be of the same construction as the member 30 heretofore described. The container 60, which may be of any suitable size, construction and material, has a bottom member 61 hinged thereto to move around the pivot 62, and each side of the bottom member 61 is provided with a pair of pins 63, each of which carries a stirrup member 64 here shown as of the same construction as the member 38 heretofore described. Stops 65 are provided at each side of the container analogously as the stop members 43 of the embodiments heretofore described.

When the container 63 is setting on a horizontal surface the stirrup members 64 are in engagement with the stop members 65. In this embodiment the hook members 59 must be elevated sufficiently so that the extremity of the rearward hook will clear the pin 42 of the forward stirrup member during backing of the truck until the rearward hook member 59 is in vertical alignment with the space between the two stirrup members, after which the boom member 17 may be lowered appropriately to bring the hook members 59 into position for cooperation with the stirrup members. Thereafter the truck may be moved to the rear sufficiently to engage the hook members 59 with the stirrup members 64 in the manner heretofore described, after which the hook members and stirrup members cooperate as heretofore explained in detail, whereby the container may be lifted, deposited or dumped by appropriately manipulating the boom structure 17, the hook members 59 remaining in cooperative relationship with the stirrup members 60 until such time as the container is again deposited on a horizontal surface, after which the truck may be moved forwardly sufficiently to disengage the hook members from the stirrup members and then, when the former are elevated to clear the latter, the truck can be moved freely away from the deposited container.

In order that the rig mounted on the truck may cooperate equally with tilt type containers as in Figs. 1 to 3 or bottom dump type containers as in Figs. 4 and 5, each type of container is provided with stirrup members as heretofore described so that they will both cooperate equally well with the same hook members 25 depending from the boom structure. However, it is to be expressly understood that if only bottom dump type containers are to be handled, so that it is unnecessary to provide a hinged joint in the connection of the container to the boom structure to provide for the relative movement of the parts from the position shown in Fig. 1 to the position shown in Fig. 2 when a tilt type container is employed, the invention within its broader aspects contemplates the use of a pair of hook members on the boom structure of sufficient length so that they may cooperate directly with the laterally projecting pins or the like on the bottom dump type container, or the stirrup members may be made of any suitable shorter length.

While the embodiment of Fig. 6 illustrates only a bottom dump type container it is within the contemplation of this invention to use a tilt type container as well as a bottom type container with this embodiment (compare Figs. 1 and 2 with Figs. 4 and 5) in which event a tilt type container, with a flaring side at either the rear face or both the front and rear faces, will be provided at both sides with a pair of suitable means for engagement by twin hooks 59 analogously as hereinabove explained in conjunction with Fig. 6.

It will therefore be perceived that by the present invention means have been provided whereby a rig carried by a manually-steered truck may be automatically engaged with and disengaged from a container without necessitating the use of a second operator, and this has been effected without need for modifying the construction of the rig itself or without requiring the use of any particular construction of container. Owing to the construction employed it is unnecessary to establish any exact relationship between the truck-carried rig and the container such as heretofore required when using a trolley on a track, and therefore the invention is appropriate for use on vehicles where the establishment of the proper relationship between the rig and the container is dependent entirely upon the operation of the steering mechanism on the vehicle. The construction employed is particularly simple in construction, so that it is easy and inexpensive to fabricate and assemble, it can be readily applied to existing constructions without modification thereof other than the addition of the hook and stirrup members to the parts now in use, and the structure is particularly strong, rugged and durable.

While the embodiments of the invention illustrated on the drawings have been described with considerable particularity, it is to be expressly understood that the invention is not limited thereto, as the same may receive a variety of expressions as will now be apparent to those skilled in the art. The invention may be readily applied to a variety of rigs other than illustrated, whether mounted on the front or the rear of the vehicle, and also to a wide variety of other containers than here shown, and changes may also be made in the details of construction, arrangement and proportion of parts, without departing from this invention. Reference is therefore to be had to the claims hereto appended for a definition thereof.

What is claimed is:

1. In transporting and dumping equipment of the character including a container adapted to rest on a horizontal surface and a rig mounted on a hand-steered vehicle including mechanism for raising and lowering the container with respect to said rig, means for engaging and disengaging said mechanism with and from said container by movement of the vehicle relatively thereto including a pair of substantially rigid members pivotally mounted on and depending from said mechanism, said members being spaced apart by a distance approximately equaling the width of said container, each of said members including an attaching device at its lower end, container-elevating means comprising a pair of members one pivotally mounted on each side of said container and each provided with an attaching element adapted to cooperate with the associated attaching device, and means on the sides of said container normally supporting said second members to position said elements at a height above the associated devices for engagement by said first members when said rig is moved into cooperative relationship with said container, said first members having sliding engagement with said elements whereby relative movement between said rig and said container brings said elements and devices into cooperative engagement.

2. Transporting and dumping equpment as defined in claim 1, said first members and attaching devices comprising hooks having elongated shanks pivotally mounted on said mechanism, and said container-elevating means comprising a pair of stirrup members pivotally mounted on the sides of said container and each including a pin adapted to engage the shank of a hook when said rig is moved into cooperative relationship with said container.

3. Transporting and dumping equipment as defined in claim 2, each of said attaching devices including a plurality of hooks, and each of said container-elevating means comprising a corresponding number of attaching elements each adapted to engage the shank of one of the hooks when said rig is moved into cooperative relationship with said container.

4. In transporting and dumping equipment of the character including a tilt type container adapted to rest on a horizontal surface and a rig mounted on a hand-steered vehicle including mechanism for raising and lowering the container with respect to said rig, means for engaging and disengaging said mechanism with and from said container by movement of the vehicle relatively thereto including a pair of members pivotally suspended on said mechanism and spaced by an amount approximately equaling the width of said container, each of said members including an attaching device at its lower end, a pair of members one pivotally mounted at one of its ends on each side of said container and including an attaching element at its free end adapted to be engaged with the associated attaching device when said rig is moved into cooperative relationship with said container, and stop means carried by the sides of said container for limiting the gravitational movement of said second members to position said attaching elements for engagement with said attaching devices when said rig is moved into such cooperative relationship with said container, said attaching elements and devices cooperating to provide hinge joints intermediate the connections of said members to said mechanism and container respectively whereby when said container is tilted while suspended from said mechanism, said members assume angularly related positions without disengaging said devices from said elements so that a pull on said first members is effective to restore said container to untilted position.

5. In transporting and dumping equipment of the character including a container adapted to rest on a horizontal surface and having a bail pivoted to the container adjacent its bottom and a rig mounted on a hand-steered vehicle including mechanism for raising and lowering the container with respect to said rig and a hook for engaging said bail, means for engaging and disengaging said mechanism with and from said container by movement of the vehicle relatively thereto including members pivotally mounted on the sides of said container and each including an attaching element adjacent the free end thereof, a pair of members pivotally suspended on said mechanism and each including an attachment element adjacent the free end thereof, and stops on said container for holding said first named members in position for the cooperative engagement of said attaching elements when said rig is moved into cooperative relationship with said container, said members providing a hinge joint in the connection between said mechanism and said container whereby when said bail is engaged with said hook and said mechanism is lowered to tilt said container about the bail axis, said members assume angularly related positions without disengaging the connections between said elements and thereafter cooperate to restore said container to untilted position when said mechanism is raised.

6. In transporting and dumping equipment of the character including a container adapted to rest on a horizontal surface and a rig mounted on a hand-steered vehicle including mechanism for raising and lowering the container with respect to said rig, means for engaging and disengaging said mechanism with and from said container by movement of the vehicle relative thereto including a pair of arms each pivotally mounted at one end on one of the sides of the container and each having a laterally extending pin adjacent its free end, a pair of members pivotally suspended from said mechanism and spaced by an amount approximately equaling the spacing of said pins, each of said members having at its lower end a hook opening toward said container, and stops on the side of said container for holding said arms in positions inclined upwardly toward said vehicle with said pins located at the proper height for engagement with said members above said hooks as said rig is moved toward said container, said members thereby swinging toward said vehicle and sliding over said pins to bring said hooks into engagement with said pins for lifting said container when said mechanism is raised, said hook and pin connections forming hinge joints movable away from said vehicle when said container is supported on said vehicle and said mechanism is lowered relative thereto and thus enabling each arm and its associated member to assume angularly related positions without disengagement of said connections.

7. In transporting and dumping equipment of the character including a container adapted to rest on a horizontal surface and having a bail pivoted to the lower portion thereof and a rig mounted on a hand-steered vehicle and including mechanism for raising and lowering the container with respect to said rig and a dumping hook for engaging said bail, means for engaging and disengaging said mechanism with and from said container by movement of the vehicle relative thereto including a pair of arms each pivotally mounted at one end on one of the sides of the container and each having a laterally extending pin adjacent its free end, a pair of members pivotally suspended from said mechanism and spaced by an amount approximately equaling the spacing of said pins, each of said members having at its lower end a hook opening toward said container, and stops on the sides of said container for holding said arms in positions inclined upwardly toward said vehicle with said pins located at the proper height to engage said members above their hooks as said rig is moved toward said container, said members thereby swinging toward said vehicle and sliding over said pins to bring said hooks into engagement with said pins for lifting said container when said mechanism is raised, said hook and pin connections forming hinge joints movable away from said vehicle when said bail is engaged with said dumping hook and said mechanism is lowered to tilt said container about the bail axis to its dumping position and thus enabling each arm and its associated member to assume angularly related positions without disengagement of said connections, said stops moving away from the vehicle as the container tilts and being engageable by said arms when said mechanism is raised to restore said container to its untilted position.

GEORGE R. DEMPSTER.

REFERENCES CITED

The following references are of record in the file of this patent:

UNITED STATES PATENTS

| Number | Name | Date |
|---|---|---|
| 203,541 | Henkel | May 14, 1878 |
| 1,052,096 | Schulze | Feb. 4, 1913 |
| 1,226,253 | Reese | May 15, 1917 |
| 2,069,697 | Dempster | Feb. 2, 1937 |
| 2,162,839 | Dempster | June 20, 1939 |
| 2,164,740 | Gerosa et al. | July 4, 1939 |
| 2,179,779 | Dempster | Nov. 14, 1939 |
| 2,273,359 | Johnson | Feb. 17, 1942 |
| 2,313,514 | Brooks | Mar. 9, 1943 |
| 2,349,578 | Ellen | May 23, 1944 |